April 1, 1969     E. W. MERRILL     3,435,796

METHOD AND APPARATUS FOR DRAG REDUCTION

Filed Nov. 13, 1967

*INVENTOR.*
Edward W. Merrill
BY

3,435,796
METHOD AND APPARATUS FOR DRAG REDUCTION

Edward W. Merrill, Cambridge, Mass., assignor, by mesne assignments, to the United States of America as represented by the Secretary of the Navy
Filed Nov. 13, 1967, Ser. No. 682,456
Int. Cl. B63b 1/34
U.S. Cl. 114—67      14 Claims

ABSTRACT OF THE DISCLOSURE

A system for reducing drag on a submerged aquatic body is proposed whereby a dilute polymer solution is created in the boundary layer of seawater surrounding the body by mixing into seawater a heated slurry or granulated or powdered polymer. The heated slurry is a particulate dispersion of long chain polymers that are soluble in seawater at any naturally occurring temperature, but insoluble in seawater at temperatures above approximately 70° C. When the heated slurry is exposed to the cold water, under appropriate mixing conditions, the micronsize particles swell and dissolve without, in the process, forming a gummy, viscous continuum. In the boundary layer, under shear, they form a molecular solution of elongated molecules in line with the laminar flow to repress the development of classical turbulence.

---

The invention described herein may be manufactured and used by or for the Government of the United States of America for governmental purposes without the payment of any royalties thereon or therefor.

This invention relates to the reduction of drag on aquatic vehicles and, more specifically, to the introduction of a heated polymer slurry into the surrounding seawater.

The addition of polymers to the water surrounding an aquatic vessel to reduce drag on the vessel has been known for some time. The more recent systems recite the non-Newtonian behavior of solutions of these additives as they are released into the seawater. For the most part, these systems rely on a gummy or viscous solution ejected into the boundary layer surrounding the vehicle. This viscous or visco-elastic solution, acting as a damping medium fixed to the body of the vehicle, reduces drag by preventing turbulence in the boundary layer. As contrasted with the above non-Newtonian systems, the present invention contemplates the utilization of Newtonians fluids wherein long chain molecules are put into molecular solution in the water surrounding the aquatic vehicle at low concentrations. This invention accomplishes introducing the slurry into the boundary layer by first mixing a hot slurry of the polymer with seawater and then ejecting the dilute solution thereby produced into the boundary layer.

The polymer slurry is composed of micron-sized particles dispersed in hot water. When the slurry is mixed with cool, agitated seawater, a molecular solution is formed. In the molecular solution, the spacing between the individual molecules is in the Angstrom range, which accounts for the Newtonian behavior of the solution. In non-Newtonian systems the solution ejected into the boundary layer is viscous and gummy, having micron-sized molecular agglomerations. Molecules in this visco-elastic stage are not separated and cannot, therefore, efficiently suppress classical turbulence.

In order to avoid such a visco-elastic or gummy stage, a hot slurry must be introduced into the cool seawater. In order to achieve a slurry consisting of a dispersion of the polymer in water, the polymer must become insoluble in water as the temperature of the water is raised. This prohibits the dry polymer powder from going into true solution during mixing and makes possible the formation of a low-viscosity dispersion of the polymer in the heated water. This hot dispersion with its molecules separate and coiled is then mixed into and diluted by the surrounding seawater under conditions of violent agitation. When the dispersion makes contact with the seawater, the micron-sized particles swell and disperse into molecular solution without going through a viscous, gummy stage. The solvated polymer molecules then line up with the laminar flow along the length of the aquatic body, thus preventing the formation of turbulence.

Although the drag produced by the bow wave in semi-submersed vehicles is much greater than the drag produced by turbulent flow, the system will reduce drag on any body moving through water. It will be appreciated, however, that this form of drag reduction achieves best results with a completely submerged aquatic body.

It is an object of this invention to reduce drag on a moving aquatic body by introducing a heated polymer directly into the boundary layer surrounding the moving body.

It is an object of this invention to reduce drag on a moving aquatic body by mixing seawater with a heated polymer slurry prior to the ejection of this mixture into the boundary layer surrounding the body.

It is a further object of this invention to reduce drag on a moving aquatic body by ejecting a hot polymer slurry radially or in advance of the aquatic body.

Other objects, advantages and novel features of the invention will become apparent from the following detailed description of the invention when considered in conjunction with the accompanying drawings wherein.

Figure 1:
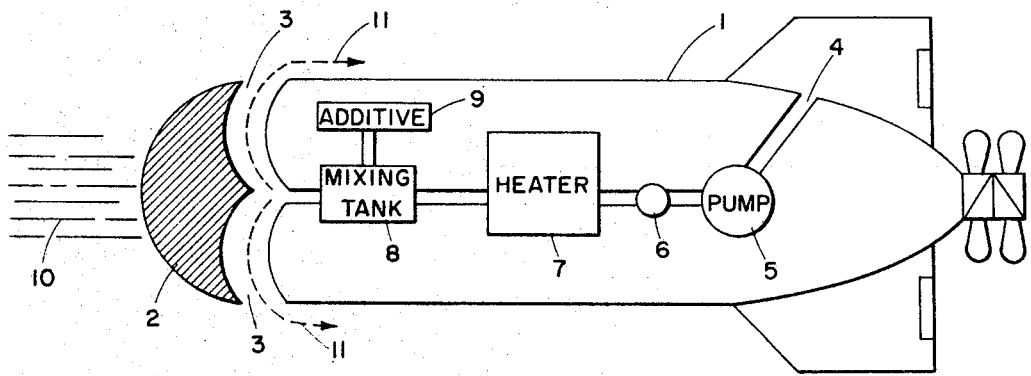
FIG. 1 is a diagrammatic representation of a vehicle housing an additive system showing radial ejection of the heated polymer slurry into the surrounding seawater.

Referring to FIG. 1, a vehicle 1 whose drag is to be reduced is shown oriented with respect to fluid flow 10. Vehicle 1 has an inlet 4 at its rear for supplying surrounding seawater to pump 5. The output of pump 5 is controlled by a suitable valve 6 and is then fed under pressure to heater 7 which heats the seawater above 70° C. The output of heater 7 is connected to the mixing tank 8. The hot seawater under pressure in this tank is mixed with a polymer in dry, granular form supplied from tank 9 and metered into mixing tank 8 by a suitable metering device such as that shown in U.S. Patent No. 3,286,674 of Nov. 22, 1966. The mixed dispersion of polymer in hot seawater represented by dotted line 11 is then expelled by radial passages 3 into the surrounding seawater at the front of vehicle 1. Ejection at the front of the vehicle permits ejection in the laminar flow area which occurs ahead and part way down a completely submerged aquatic body moving in a fluid medium. This allows the long chain molecules to uncoil without substantial interlacing or fouling.

Either seawater or fresh water may be used in the mixing operation. It will be further understood that although seawater from the surrounding ocean is convenient for use in the mixing process, a supply of fresh water may be wholly contained within the vehicle and used for this purpose. It has been found that boiling water is preferable to prevent the polymer from going into solution. This permits the required dispersion at the mixing stage. Temperatures from 90° C. to 140° C. have been used. At these temperatures, the water and the polymer combine to form a dispersion of the random coiling polymers of high molecular weight. The polymer is selected so that it becomes insoluble as the temperature of the water is raised. The polymer may be composed of either ethyl or methyl esters of cellulose as well as mixed esters of cellulose whereby the cellulose chain has substituted for the hydrogen of certain of its hydroxyls a methyl or an ethyl group at random. Polyethylene oxide has been found to be highly satisfactory since for a given molecular weight it presents a greater contour length to the flow medium than do other polymers. This occurs because polyethylene oxide has fewer side bonds per unit length. It also has the required thermodynamic property of becoming insoluble in water as temperature is raised. In the case of polyethylene oxide of a high molecular weight grade, only a few parts per million (p.p.m.) of polymer in water is needed to repress turbulence.

Polyethylene oxide in fine granular form when mixed in hot water swells to a very limited extent so that a very fluid, easily pumped slurry results. When this slurry is released into moving water with mixing and dilution, the long chain polymers uncoil and dissolve. In a shear field, as in a boundary layer, they line up with the flow and act as damping chains to prevent turbulence. The prevention of turbulence results in a significant reduction in drag and a 30% to 50% increase in the terminal velocity of the vehicle. Too much polyethylene oxide causes the molecular strings to become entangled and lose their damping efficiency. In practice, the dispersion as ejected may contain from 10 to 500 p.p.m. of polyethylene oxide. The average concentration in the boundary layer may be from 0.1 to 50 p.p.m. of polyethylene oxide.

In a hot slurry system ordinarily when the hot slurry is cooled, it becomes visco-elastic and highly viscous. If, however, the hot slurry is diluted with agitated seawater prior to ejection, it will disperse into molecular solution without passing through this gummy stage. The amount of polymer additive in the boundary layer is kept small, usually less than 20 p.p.m. of polyethylene oxide having a molecular weight of $4.5 \times 10^{-6}$. The seawater is premixed with this dilute slurry and then expelled into the water surrounding the vehicle.

Figure 2:
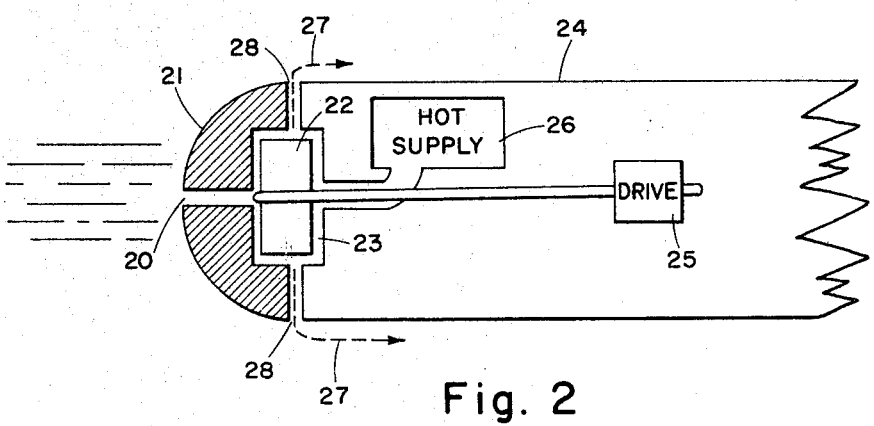
FIG. 2 shows a premixing system whereby seawater is mixed with the slurry inside the vehicle and then radially ejected into the surrounding seawater.

FIG. 2 shows a premixing system, designed to eliminate the aforementioned visco-elastic stage, where water entering orifice 20 in nose 21 is agitated by impeller 22 housed in chamber 23 into which hot dispersion from supply 26 is fed.

The exact metering is achieved by the use of impeller 22 in the nose of the vehicle 24, powered by a source 25 within the vehicle. Seawater drawn through a small orifice 20 in the nose is admixed with the ejected hot polymer slurry, in the correct ratio so that this molecular solution, at perhaps five times the final desired concentration shown by dotted lines 27 of approximately 5 p.p.m., would issue through the circumferential slot 28. Radial baffles (not shown) in the slot may be used to assure distribution of the dilute polyethylene oxide solution around the vehicle. As the polymer solution at 25 p.p.m. issues from the slot and streams along the cylindrical body of the torpedo, it undergoes further dilution with the sea, as the boundary layer thickens. Since friction drag is to be reduced, it is necessary to place the slot 28 close to the nose 21, so that the boundary layer formed thereon will remain laminar as it meets the polymer solution from the circumferential slot 28. It will be apparent that any type of premixing system which agitates the slurry while it is being diluted by seawater will prevent the visco-elastic stage.

Figure 3:
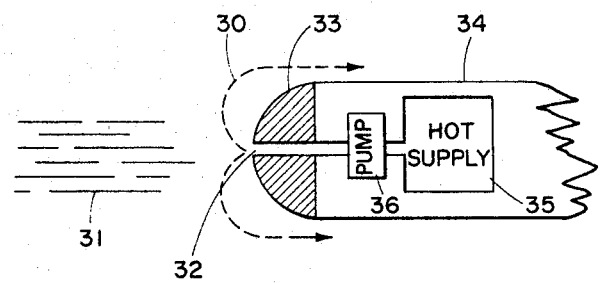
FIG. 3 is a diagrammatic representation of a forward ejection system.

As shown in FIG. 3, the hot dispersion 30 may also be ejected ahead of the vehicle into flow stream 31 from forward nozzle 32 propecting through nose 33 of vehicle 34. The nozzle is fed with a hot polymer slurry under pressure from pump 36. Pump 36 is connected to supply 35 which may be arranged similarly to the system shown in FIG. 1. Here the slurry streams back over the vehicle body. In both the forward and radial ejection cases, it has been found that maximum drag reduction is achieved with vehicles having large length to diameter ratios. With a concentration of about 20 weight percent of polyethylene oxide in boiling water, the preferred length to diameter ratios range from 4 for the minimum ratio to 20 for the maximum ratio in the case of torpedo-like aquatic vehicles.

Obviously many modifications and variations of the present invention are possible in the light of the above teachings. It is therefore to be understood that within the scope of the appended claims the invention may be practiced otherwise than as specifically described.

What is claimed is:

1. A system for reducing drag caused by turbulence propagated around a body moving through a fluid medium, comprising:
   a supply of a high molecular weight long chain polymer stored within said body,
      said polymer being insoluble in water having a temperature above 70° C.;
   means for forming a slurry of said polymer with water heated above 70° C.; and
   means for ejecting said slurry from said body such that ejected slurry streams back along the length of said body forming a molecular solution with the contiguous fluid medium, whereby turbulence is prevented from forming along the length of said body.

2. The drag reduction system as recited in claim 1 wherein said polymer is polyethylene oxide.

3. The drag reduction system as recited in claim 2 wherein the concentration of said polyethylene oxide in said water is 10 to 500 p.p.m.

4. The drag reduction system as recited in claim 2 wherein the average concentration of polyethylene oxide in said contiguous fluid medium is between .1 and 50 p.p.m.

5. A system for reducing drag caused by turbulence propagated around a body moving through a fluid medium, comprising:
   a supply of a high molecular weight long chain polymer stored within said body,
      said polymer being insoluble in water having a temperature above 70° C.;
   means for forming a slurry of said polymer with water heated above 70° C.;
   means for agitating said slurry together with fluid obtained from the surrounding fluid medium so as to produce a molecular solution while preventing said slurry from becoming visco-elastic; and
   means for ejecting said molecular solution from said body to minimize drag thereon.

6. The drag reduction system as recited in claim 5 wherein said ejection is radial to said body.

7. The drag reduction system as recited in claim 5 wherein said ejection is in advance of said body.

8. The drag reduction system as recited in claim 5 wherein said slurry is formed with a fluid derived from the surrounding fluid medium and heated within said body.

9. The drag reduction system as recited in claim 5 wherein said polymer is polyethylene oxide.

10. The drag reduction system as recited in claim 5 wherein the concentration of said polyethylene oxide in said water is 10 to 500 p.p.m.

11. The drag reduction system as recited in claim 5 wherein the average concentration of said polyethylene oxide in the contiguous fluid medium is between .1 and 50 p.p.m.

12. A method for reducing drag caused by turbulence developed around a moving aquatic body, comprising:
   adding to the boundary layer of water adjacent said body a polymer dispersion heated above 70° C.,
      said polymer dispersion comprising a long chain high molecular weight polymer in water,
      said polymer further having the property of becoming insoluble in water having a temperature above 70° C.,
whereby said heated polymer dispersion when added to said boundary layer goes into molecular solution with said water in said boundary layer to prevent said turbulence from forming along the length of said body.

13. A method for reducing drag caused by turbulence developed about a body moving through water, comprising:
heating a supply of water above 70° C.;
mixing said heated water with a high molecular weight long chain polymer,
said polymer having the property of becoming insoluble as the water temperature is raised over 70° C., whereby said mixture forms a disperpersion of said polymer in said heated water; and
introducing said hot dispersion into the laminar flow region developed at the forward portion of said moving body such that said dispersion streams backwardly over said body as said dispersion goes into molecular solution, whereby said long chain polymer molecules in solution extend and line up parallel to said body and adjacent thereto along the length of said body.

14. The method as recited in claim 13 further comprising the additional step of mixing said hot dispersion with water entering the front end of said body prior to introducing said mixture into the seawater surrounding said body.

References Cited

UNITED STATES PATENTS

| | | | |
|---|---|---|---|
| 3,367,542 | 2/1968 | Madison | 114—67 XR |
| 3,382,831 | 5/1968 | Madison | 114—67 XR |
| 3,382,832 | 5/1968 | Swanson | 114—67 XR |

ANDREW H. FARRELL, *Primary Examiner.*

U.S. Cl. X.R.

114—20